United States Patent
Scott et al.

(10) Patent No.: US 9,158,453 B2
(45) Date of Patent: Oct. 13, 2015

(54) HUMAN-MACHINE INTERFACE HAVING MULTIPLE TOUCH TREND MANIPULATION CAPABILITIES

(75) Inventors: Steven J. Scott, Ocononowoc, WI (US); Thong T. Nguyen, Anaheim, CA (US); Greggory Cieslak, Greendale, WI (US); Thomas Lloyd Heidebrecht, Cambridge, WI (US); Pete J. Klein, Kenosha, WI (US); Gary Dan Dotson, Muskego, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 2001 days.

(21) Appl. No.: 12/242,396

(22) Filed: Sep. 30, 2008

(65) Prior Publication Data

US 2010/0079499 A1   Apr. 1, 2010

(51) Int. Cl.
*G06T 11/20* (2006.01)
*G06F 3/0481* (2013.01)
*G06F 3/0488* (2013.01)
*G06F 3/048* (2013.01)
*G06F 17/30* (2006.01)

(52) U.S. Cl.
CPC .......... *G06F 3/04883* (2013.01); *G06T 11/203* (2013.01); *G06T 11/206* (2013.01); *G06F 3/048* (2013.01); *G06F 3/0488* (2013.01); *G06F 17/30994* (2013.01)

(58) Field of Classification Search
CPC . G06F 3/048; G06F 3/04881; G06F 3/04883; G06F 3/04887; G06F 3/04888; G06F 17/30994; G06T 11/206; G06T 11/203
USPC ........... 345/440–442, 660–661; 715/833–856
See application file for complete search history.

(56) References Cited

U.S. PATENT DOCUMENTS

| | | | |
|---|---|---|---|
| 5,226,118 A * | 7/1993 | Baker et al. | 715/833 |
| 5,694,150 A * | 12/1997 | Sigona et al. | 715/856 |
| 6,889,096 B2 | 5/2005 | Spriggs et al. | |
| 7,092,771 B2 | 8/2006 | Retlich et al. | |
| 7,152,030 B2 | 12/2006 | Nagashima et al. | |
| 7,230,611 B2 | 6/2007 | Bischoff | |
| 7,324,856 B1 | 1/2008 | Bromley | |
| 2003/0028269 A1 | 2/2003 | Spriggs et al. | |
| 2003/0177440 A1 | 9/2003 | Kegoya et al. | |
| 2004/0008191 A1 * | 1/2004 | Poupyrev et al. | 345/184 |
| 2004/0150668 A1 | 8/2004 | Myers et al. | |
| 2005/0149639 A1 | 7/2005 | Vrielink et al. | |
| 2007/0019641 A1 * | 1/2007 | Pai et al. | 370/389 |
| 2007/0142941 A1 | 6/2007 | McGreevy et al. | |
| 2007/0229471 A1 | 10/2007 | Kim et al. | |
| 2008/0016452 A1 | 1/2008 | Pincus | |

* cited by examiner

*Primary Examiner* — Jin-Cheng Wang

(57) ABSTRACT

A Human-Machine Interface (HMI) system comprises a machine interface, a processing system, and a user interface. The machine interface receives operational data associated with an operation of a machine. The processing system processes the operational data associated with the operation of the machine to determine a trend in the operational data. The user interface displays a graphical representation of the trend, and receives a first user input and a second user input simultaneously on a surface of the user interface. The processing system processes the first user input and the second user input to determine a change in the trend. The user interface displays a graphical representation of the change in the trend.

20 Claims, 7 Drawing Sheets

HUMAN-MACHINE INTERFACE HAVING MULTIPLE TOUCH TREND MANIPULATION CAPABILITIES

TECHNICAL FIELD

The invention is related to the field of human-machine interfaces, and in particular, to a system that displays graphical representations of changes in trend data that are generated by a human-machine interface.

TECHNICAL BACKGROUND

Industrial environments include automobile manufacturing factories, food processing plants, and microprocessor fabrication facilities. The typical industrial environment includes various machines, such as pumps, motors, and robots. These machines continually produce data that indicates the current status of the machines, such as the machine's pressure, temperature, or speed.

The typical industrial environment also includes a Human-Machine Interface (HMI). The HMI receives and processes the status data from the machines to generate various graphical displays. The graphical displays indicate the current and historical status of the machines. For example, an HMI graphical display might indicate the pressure of a pump, the speed of a motor, or the output of a robot. The HMI may also control the machines. For example, the HMI might turn on a pump, speed-up a motor, or stop a robot.

The HMI may allow a user to manipulate various graphical displays. Unfortunately, the user must operate traditional input devices such as a keyboard and mouse to cause a desired alteration of a graphical display. This method of image manipulation may be too slow, inefficient, or cumbersome for some users.

TECHNICAL SUMMARY

A Human-Machine Interface (HMI) system comprises a machine interface, a processing system, and a user interface. The machine interface receives operational data associated with an operation of a machine. The processing system processes the operational data associated with the operation of the machine to determine a trend in the operational data. The user interface displays a graphical representation of the trend, and receives a first user input and a second user input simultaneously on a surface of the user interface. The processing system processes the first user input and the second user input to determine a change in the trend. The user interface displays a graphical representation of the change in the trend.

In some examples, the user interface is configured to display the graphical representation of the change in the trend by expanding the graphical representation of the trend.

In some examples, the user interface is configured to display the graphical representation of the change in the trend by compressing the graphical representation of the trend.

In some examples, the user interface is configured to display the graphical representation of the change in the trend by changing a scale of the graphical representation of the trend.

In some examples, the user interface is configured to display the graphical representation of the change in the trend by removing a portion of the graphical representation of the trend.

In some examples, the user is interface configured to display the graphical representation of the change in the trend on a second display.

In some examples, the processing system is configured to send the operational data corresponding to the graphical representation of the change in the trend to a storage system.

Also disclosed herein is a method of operating a Human-Machine Interface (HMI) system wherein the method comprises receiving operational data associated with an operation of a machine, processing the operational data associated with the operation of the machine to determine a trend in the operational data, displaying a graphical representation of the trend, receiving a first user input and a second user input simultaneously on a surface of a user interface, processing the first user input and the second user input to determine a change in the trend, and displaying a graphical representation of the change in the trend.

Also disclosed herein is a software product configured to operate a Human-Machine Interface (HMI) system. The software product comprises HMI operation software, HMI interface software, and a storage system that stores the HMI operation software and the HMI interface software. The HMI interface software is configured to direct a machine interface to receive operational data associated with an operation of a machine. The HMI operation software is configured to direct a processing system to process the operational data associated with the operation of the machine to determine a trend in the operational data. The HMI interface software is configured to direct a user interface to display a graphical representation of the trend, and receive a first user input and a second user input simultaneously on a surface of the user interface. The HMI operation software is configured to direct the processing system to process the first user input and the second user input to determine a change in the trend. The HMI interface software is configured to direct the user interface to display a graphical representation of the change in the trend.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Described herein is a system and method for manipulating trend graphs in a Human-Machine Interface (HMI) system. An HMI system can receive status information from machines in an industrial environment and display that information in a graphical form, called trend graphs. Many operators, managers, and other workers who interact with machinery using an HMI system desire to manipulate the trend graphs for viewing the data in different ways.

Examples of possible manipulations to trend graphs include changing the scale of a graph by zooming out from a section of a trend, or by drilling down or zooming in to a section of a trend. A user may wish to rotate a trend along an x-axis, y-axis, or z-axis, or alter the rate at which the trend data is displayed. A user may desire to tag multiple points or sections along a trend. A user may wish to remove portions of a trend to view separately, or in order to view the trend without the removed portions.

In order to achieve the above described and similar manipulations, a user could, for example, utilize an HMI system incorporating a multi-touch screen capable of receiving multiple simultaneous touches from the user. Based on the multiple touches the user provided on the surface of the touch screen, the HMI system could process the touches to determine a change in the trend. The HMI system could then display the change in the trend requested by the user's touches.

Figure 1:
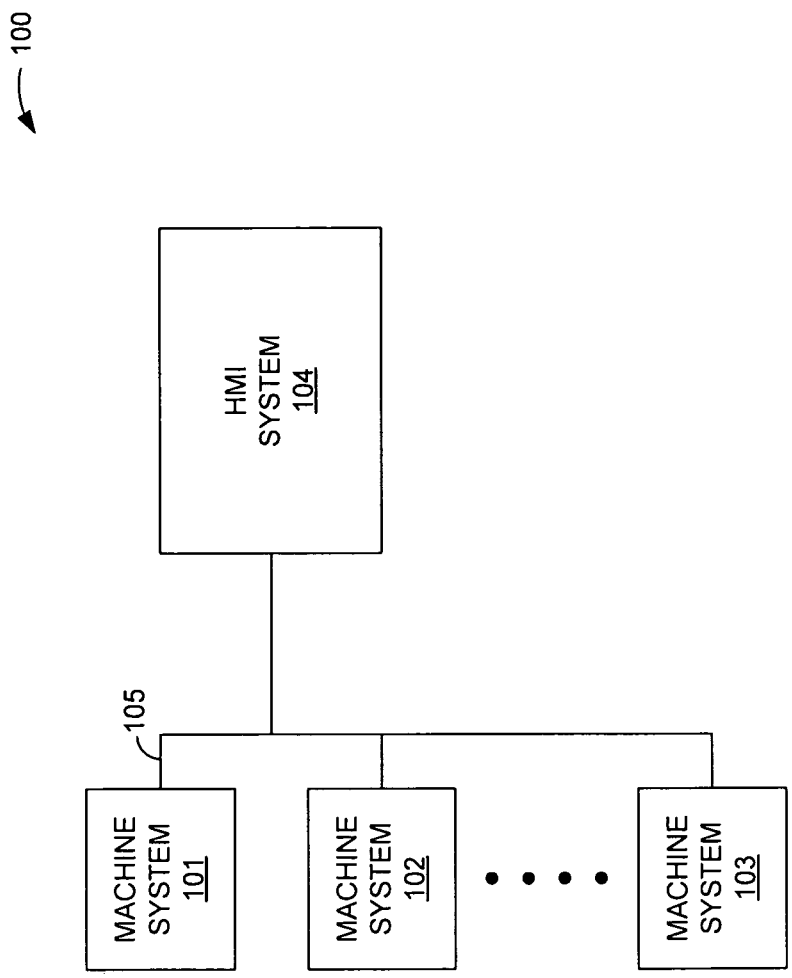
FIG. 1 is a block diagram illustrating an industrial environment.

FIG. 1 is a block diagram illustrating industrial environment 100. Industrial environment 100 comprises machine systems 101-103, Human-Machine Interface (HMI) system 104, and communication system 105. The number of machine systems and HMI systems shown in FIG. 1 have been restricted for clarity, but there would typically be many more. Machine systems 101-103 and HMI system 104 communicate over communication system 105.

Industrial environment 100 includes machine systems 101-103, HMI system 104, and communication system 105. Industrial environment 100 comprises an automobile manufacturing factory, food processing plant, microprocessor fabrication facility, or some other type of industrial enterprise. Machine systems 101-103 comprise pumps, motors, robots, or some other mechanical apparatus, including their associated control systems. A control system comprises, for example, a programmable logic controller (PLC). Additionally, machine systems 101-103 comprise other, non-mechanical elements, such as a brew kettle in a brewery, a reserve of coal or other resources, or any other element that may reside in an industrial environment 100.

Machine systems 101-103 continually produce operational data over time. The operational data indicates the current status of machine systems 101-103, such as pressure, temperature, speed, or some other status metrics. The operational data may comprise dynamic charts or trends, real-time video, or some other graphical content. Machine systems 101-103 continually transfer the operational data to HMI system 104 over communication system 105. In addition, HMI system 104 transfers control instructions to machine systems 101-103 over communication system 105. Communication system 105 could be a local area network, wide area network, or some other communication network—including combinations thereof.

HMI system 104 comprises computer and communication equipment and software. HMI system 104 continually receives the operational data from machine systems 101-103. HMI system 104 processes the operational data to generate various graphical displays indicating the current and historical status of machine systems 101-103. HMI system 104 also controls machine systems 101-103. For example, HMI system 104 might turn on a pump, speed-up a motor, stop a robot, boil a brew kettle, or perform some other type of machine control. Then, an HMI graphical display might indicate the pressure of the pump, the speed of the motor, the output of the robot, the temperature of the brew kettle, or some other status metric. An example of an HMI system that could be adapted in accord with this description is PanelView Plus™ supplied by Rockwell Automation. Other HMI systems are possible.

Figure 2:
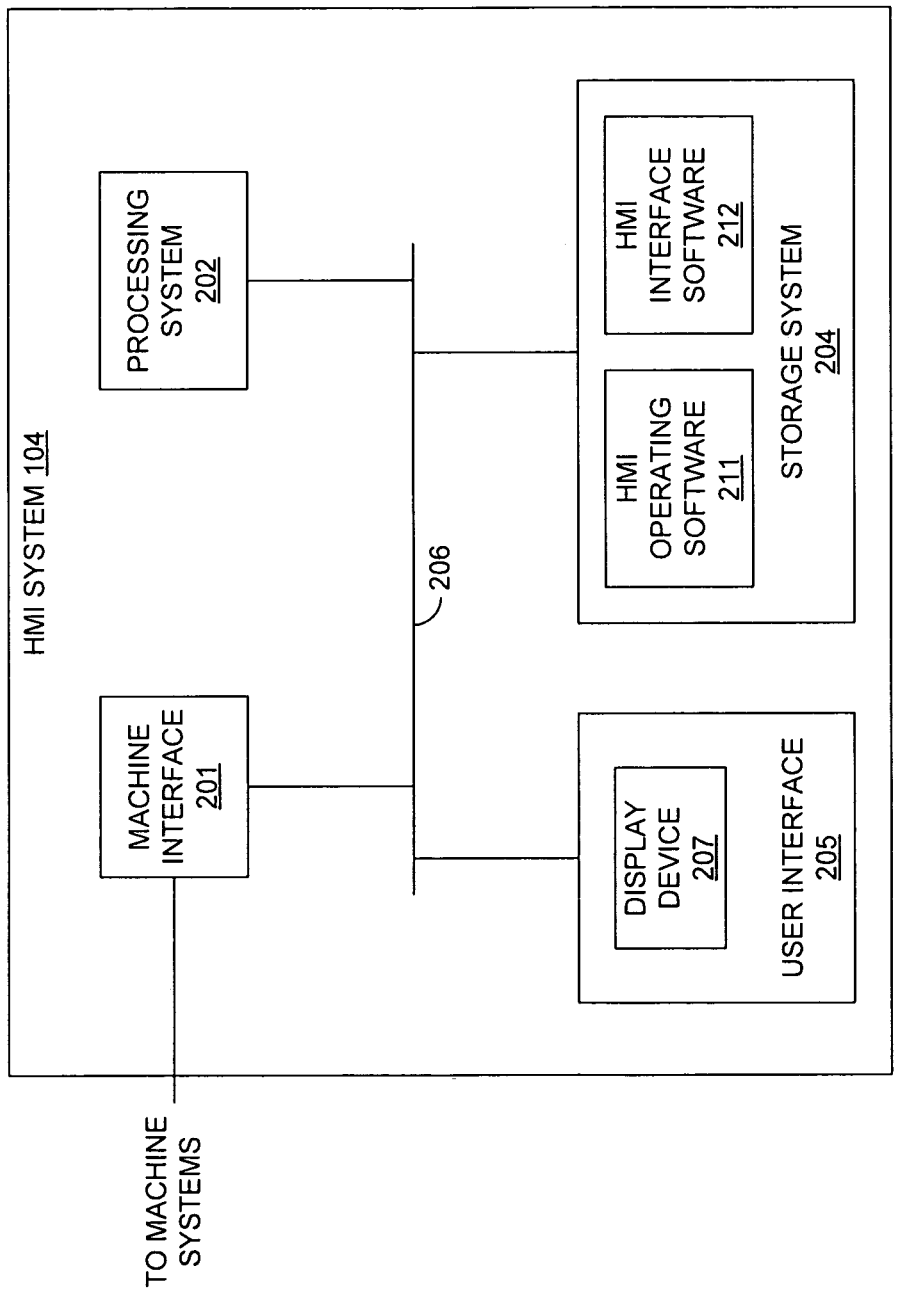
FIG. 2 is a block diagram illustrating an HMI system.

FIG. 2 is a block diagram illustrating HMI system 104. HMI system 104 comprises machine interface 201, processing system 202, storage system 204, user interface 205, and communication system 206. User interface 205 includes display device 207. Storage system 204 stores HMI operating software 211 and HMI interface software 212.

Machine interface 201 comprises communication circuitry and equipment that communicates with machine systems 101-103 over communication system 105. Processing system 202 comprises microprocessors or other logic circuitry that retrieves and executes HMI operating software 211.

User interface 205 comprises a touch screen, a touch pad, or some other user device. Display device 207 comprises a touch screen, liquid crystal display, cathode ray tube display, or some other graphical display mechanism. It should be understood that user interface 205 and display device 207 could comprise a single element providing for all user interaction, such as a touch screen. Additionally or alternatively, user interface 205 could comprise multiple user devices and multiple display devices, including a plurality of touch screens.

Storage system 204 comprises a disk, integrated circuit, flash drive, optical media, or some other memory device. Communication system 206 comprises a bus, local area network, or some other communication apparatus. The above-described components (201-207) of HMI system 104 may be integrated together or distributed among multiple devices.

HMI software 211-212 comprises an application program, firmware, or some other form of machine-readable processing instructions. HMI operating software 211 may include an operating system, utilities, drivers, networking, and applications. When executed by processing system 202, HMI software 211-212 directs HMI system 104 to operate as described herein. HMI interface software 211 comprises an application. An example of HMI interface software is RSView® supplied by Rockwell Automation. Other HMI interface software is possible.

Figure 3:
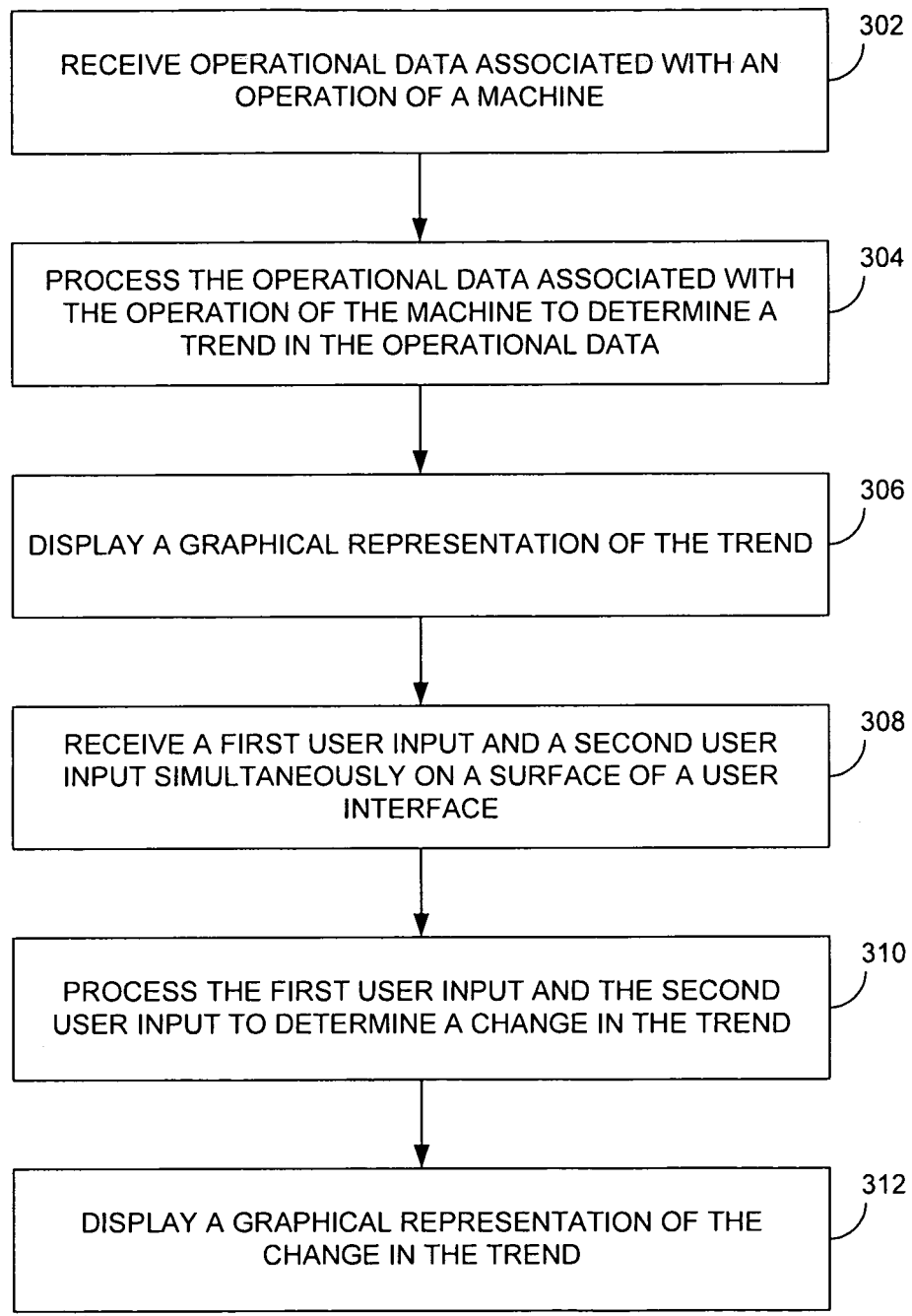
FIG. 3 is a flow diagram illustrating a method of operating an industrial environment.

FIG. 3 is a flow diagram illustrating a method of operating industrial environment 100. HMI system 104 receives operational data associated with an operation of machine systems 101-103 (operation 302). The operational data indicates the current status of machine systems 101-103, such as pressure, temperature, speed, or some other status metrics. HMI system 104 processes the operational data to determine a trend in the operational data (operation 304). HMI system 104 displays a graphical representation of the trend to a user (operation 306).

The user desires to conveniently manipulate the graphical representation of the trend in the operational data. The user operates HMI system 104 to simultaneously select at least two points on the graphical representation to provide input data to HMI system 104. After selecting the desired points on the trend, the user may provide a motion associated with each respective point. For example, to issue a command to the HMI system, the user may select two points on the trend by placing his index fingers on a touch screen at two separate locations, and then provide a motion by dragging each finger in opposite directions. The first point on the trend that the user selects and any motion associated therewith corresponds to a first user input, and the second point on the trend that the user selects and any motion associated therewith corresponds to a second user input. HMI system 104 receives the first user input and the second user input simultaneously on the surface of user interface 205 (operation 308). In one embodiment, user interface 205 comprises a touch screen capable of accepting multiple touches simultaneously from the user.

In response to the user selections, HMI system 104 processes the first user input and the second user input to determine a change in the trend (operation 310). Based on the change determined in operation 310, HMI system 104 displays a graphical representation of the change in the trend to the user (operation 312).

It should be noted that HMI system 104 may be operated by multiple users simultaneously. In one embodiment, the first user input is provided by a first user, and the second user input is provided by a second user. In another embodiment, multiple users operate HMI system 104 by simultaneously providing distinct sets of a first user input and a second user input. Accordingly, any reference to a singular user hereinabove or hereinafter comprises a single user or a plurality of users.

HMI system 104 may perform additional operations related to the change in the trend determined in operation 310. In one embodiment, HMI system 104 displays the graphical representation of the change in the trend on a second display. In this manner, a user may view the graphical representation of the altered trend on the second display, while continuing to monitor trends depicting current operational status data on the first display. In another embodiment, HMI system 104 sends the operational data corresponding to the graphical representation of the change in the trend to a storage system, such as storage system 204. Under this embodiment, if the user detects an anomaly in the graphical trend data, he may send the underlying operational data to a storage system for later review.

Figure 4:
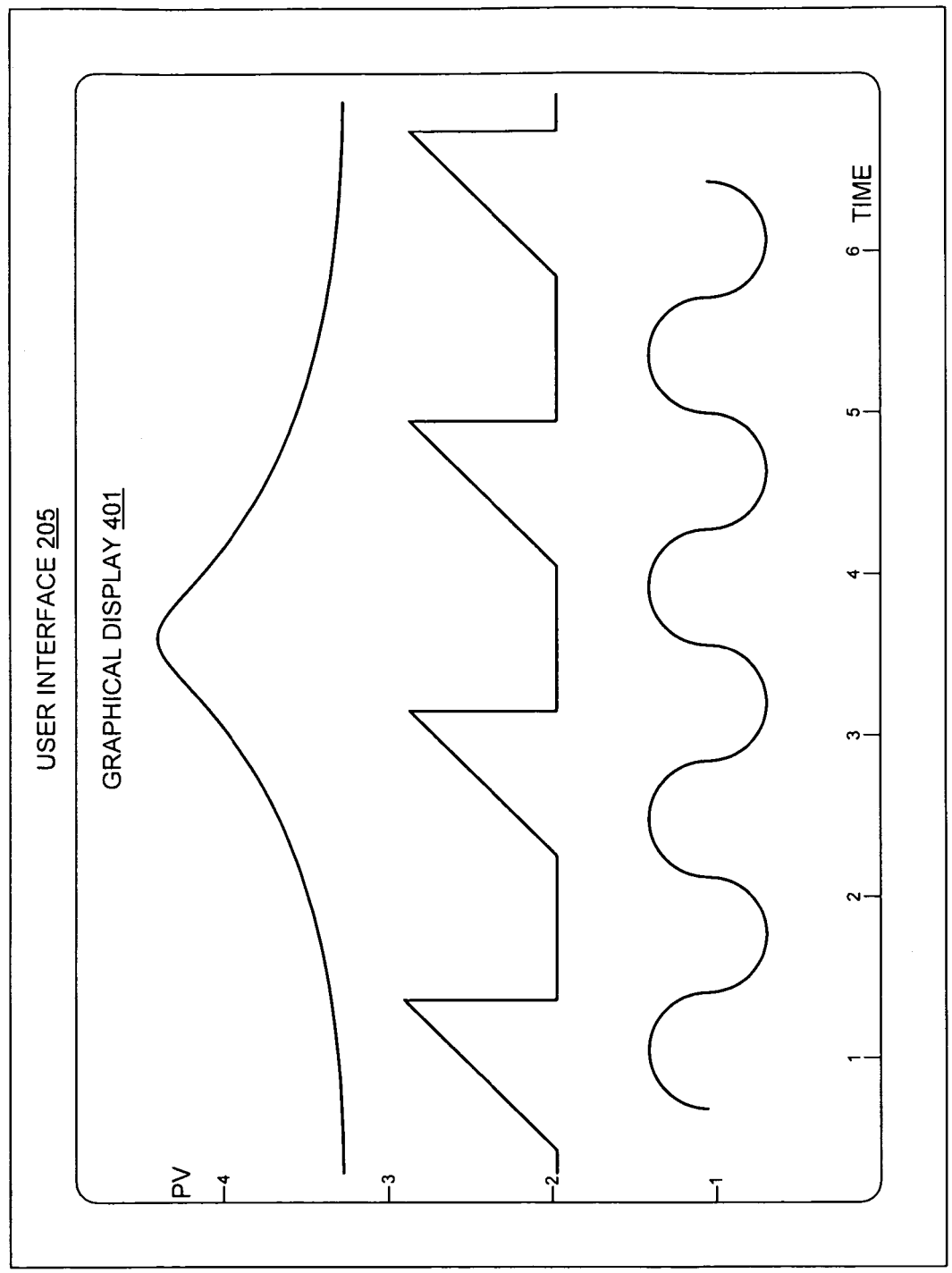
FIG. 4 is a display diagram illustrating an HMI system display.

FIG. 4 is a display diagram illustrating an HMI system 104 graphical display 401 provided by user interface 205. Graphical display 401 depicts several graphical representations of trends corresponding to underlying operational data. The operational data indicates the current status of machine systems 101-103, such as pressure, temperature, speed, or some other status metrics. Note that the trends depicted in graphical display 401 are illustrative and graphical display 401 does not depict an actual HMI graphical display. Also note that graphical display 401 may display more or fewer trends than the three trends depicted in graphical display 401.

Graphical display 401 contains a y-axis, labeled "PV" for Performance Value, and an x-axis, labeled "TIME", so that performance values of one or more machine systems are plotted against time. While graphical display 401 depicts only a single pair of axes, graphical display 401 is capable of displaying a plurality of pairs of axes, each associated with a different trend graph. Moreover, graphical display 401 is not limited to plotting only performance value and time, but may plot many different criteria and may alter the scales of the axes.

The user selects a trend to manipulate by selecting at least two points on the graphical representation of the trend. After selecting the desired points on the trend, the user may provide a motion associated with each respective point. In response to the user selections, HMI system 104 processes the user inputs to determine a change in the trend, and then displays a graphical representation of the change in the trend on user interface 205.

Figure 5:
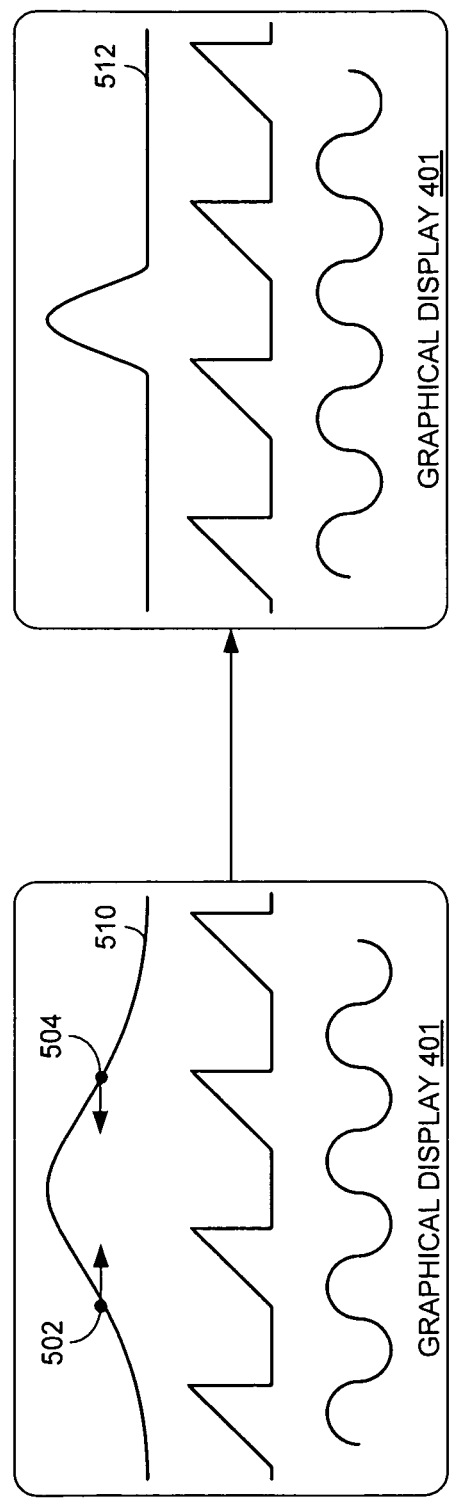
FIG. 5 is a display diagram illustrating an HMI system display.

FIG. 5 is a display diagram illustrating an HMI system 104 graphical display 401 provided by user interface 205. Note that the graph axes have been removed from graphical display 401 in FIG. 5.

In this embodiment, to effect a desired change in trend 510, a user has simultaneously selected points 502 and 504 on trend 510. The user has also provided a horizontal motion with respect to each point 502 and 504 selected, represented by the directional arrows in graphical display 401. The horizontal motion associated with point 502 is toward the right edge of graphical display 401, while the horizontal motion associated with point 504 is toward the left edge of graphical display 401. The selection of point 502 and the associated horizontal motion comprises a first user input, and the selection of point 504 and the associated horizontal motion comprises a second user input. In an example, using a touch screen, the user has placed the index finger of his left hand on point 502, and the index finger of his right hand on point 504, and simultaneously dragged his left index finger and his right index finger closer together in a horizontal motion.

HMI system 104 processes the first user input and the second user input to determine the desired change in the graphical representation of the trend. In this embodiment, the user has requested a compression of trend 510. In response, HMI system 104 displays a graphical representation of trend 510 in a compressed state, depicted by trend 512. Note that only the scale of trend 512 is altered; the scales of the other trends depicted in graphical display 401 are independent and remain unchanged. In another embodiment, all trends depicted in graphical display 401 share the same scale, so that changing the scale of one trend causes a corresponding change in scale to any other trends sharing that scale.

Figure 6:
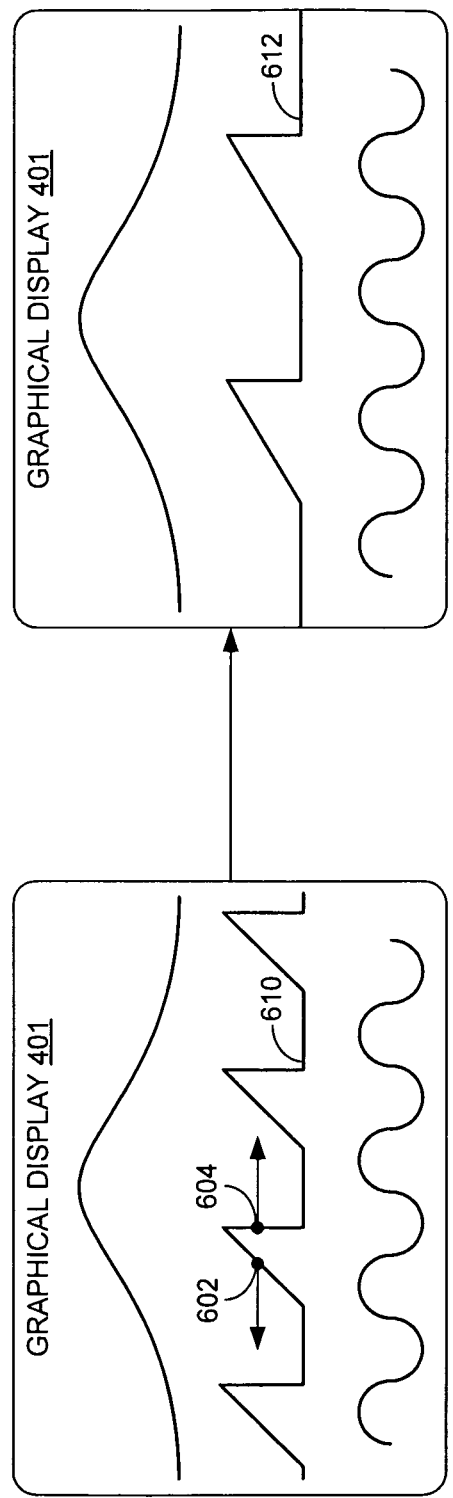
FIG. 6 is a display diagram illustrating an HMI system display.

FIG. 6 is a display diagram illustrating an HMI system 104 graphical display 401 provided by user interface 205. Note that the graph axes have been removed from graphical display 401 in FIG. 6.

In this embodiment, to cause a desired change in trend 610, a user has simultaneously selected points 602 and 604 on trend 610. The user has also provided a horizontal motion with respect to each point 602 and 604 selected, represented by the directional arrows in graphical display 401. The horizontal motion associated with point 602 is toward the left edge of graphical display 401, while the horizontal motion associated with point 604 is toward the right edge of graphical display 401. The selection of point 602 and the associated horizontal motion comprises a first user input, and the selection of point 604 and the associated horizontal motion comprises a second user input. In an example, using a touch screen, the user has placed the index finger of his left hand on point 602, and the index finger of his right hand on point 604, and simultaneously dragged his left index finger and his right index finger farther apart in a horizontal motion.

HMI system 104 processes the first user input and the second user input to determine the desired change in the graphical representation of the trend. In this embodiment, the user has requested an expansion of trend 610. In response, HMI system 104 displays a graphical representation of trend 610 in an expanded state, depicted by trend 612. Note that only the scale of trend 612 is altered; the scales of the other trends depicted in graphical display 401 are independent and remain unchanged.

Figure 7:
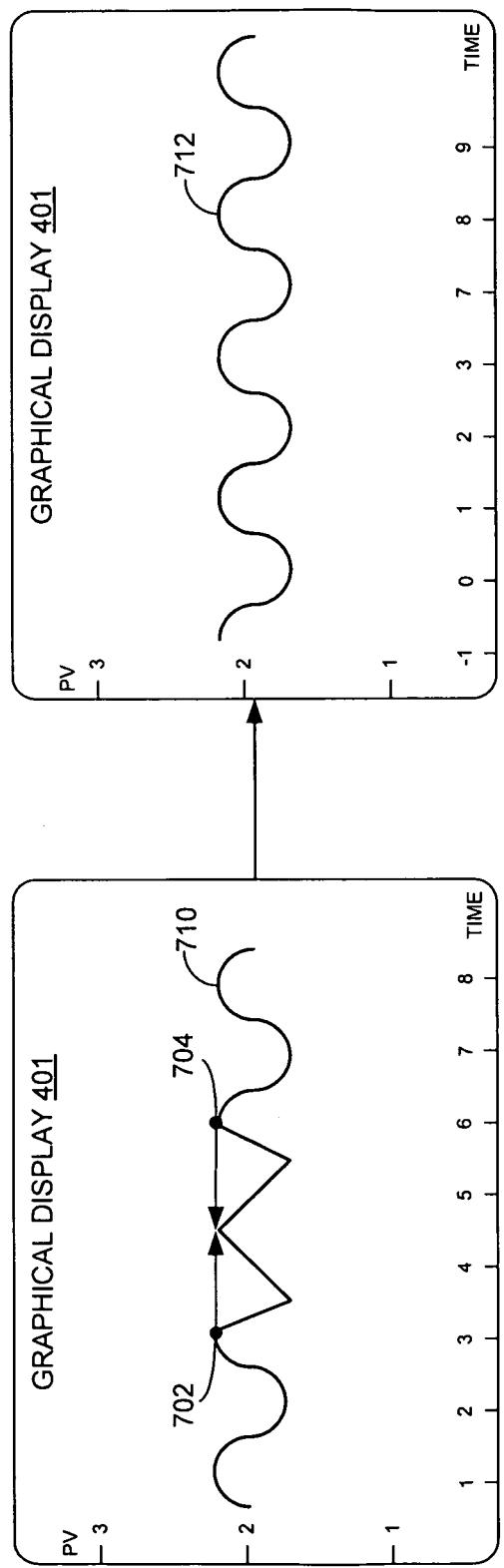
FIG. 7 is a display diagram illustrating an HMI system display.

FIG. 7 is a display diagram illustrating an HMI system 104 graphical display 401 provided by user interface 205. Note that the graph axes of graphical display 401 in FIG. 7 are a different scale than the graph axes of graphical display 401 in FIG. 4.

In this embodiment, to effect a desired change in trend 710, a user has simultaneously selected points 702 and 704 on trend 710. The user has also provided a horizontal motion with respect to each point 702 and 704 selected, represented by the directional arrows in graphical display 401. The horizontal motion associated with point 702 is toward the right edge of graphical display 401, while the horizontal motion associated with point 704 is toward the left edge of graphical display 401. The selection of point 702 and the associated horizontal motion comprises a first user input, and the selection of point 704 and the associated horizontal motion comprises a second user input. In an example, using a touch screen, the user has placed the index finger of his left hand on point 702, and the index finger of his right hand on point 704, and simultaneously dragged his left index finger and his right index finger closer together in a horizontal motion, until both fingers were touching.

HMI system 104 processes the first user input and the second user input to determine the desired change in the graphical representation of the trend. In this embodiment, the user has requested a compression of trend 710. In response, HMI system 104 displays a graphical representation of trend 710 in a compressed state, depicted by trend 712. In effect, the user has requested to remove the portion of trend 710 between points 702 and 704, resulting in a modified trend 712 that only includes the portion of trend 710 to the left of point 702 and to the right of point 704. Note that the "TIME" scale of the x-axis changes when trend 712 is displayed, indicating that the trend between time units 3 and 6 are hidden from view. Also note that additional portions of trend 712 are now displayed, represented by the portions of trend 712 visible at time units less than 1 and time units greater than 8.

In another example, a user could achieve the opposite effect by applying outward momentum from points 702 and 704. For example, by dragging his index fingers in a horizontal motion from points 702 and 704 to the edges of graphical display 401, the user could expand trend 710 so that only the portion between 702 and 704 is visible.

Advantageously, a user is able to easily manipulate any graphical representation of a trend displayed on an HMI system 104 graphical display, such as graphical display 401. HMI system 104 can alter a time scale of a graphical representation of a trend, and display a graphical representation of a change in the trend with the altered time scale. For example, by using multiple touches on a touch screen, a user may effectively change the scale of a graphical representation of a trend by zooming out from a section of a trend. Likewise, the user may effectively change the scale of a graphical representation of a trend by drilling down or zooming in to a section of a trend.

In another example, the user may rotate a trend along an x-axis, y-axis, or z-axis. The user may alter the speed of the graphically displayed incoming operational data by either slowing down or speeding up the rate at which the trend data is displayed. The user may tag multiple points or sections along a trend. The user may remove portions of a trend to view separately, or in order to view the trend without the removed portions. The user may also scroll backward in time to view recently displayed or historical data. The user can then scroll forward in time to return to a display of the presently incoming operational data. In addition, the user can scroll through multiple trends simultaneously. For example, the user may scroll backward in time on a first trend and forward in time on a second trend.

In another example, a user may combine two trends to compare the effect a variable of one trend has on a variable of another. For example, a first trend may depict the energy used by a machine over time, and a second trend may depict the operating temperature of the machine over time. A user could then touch the first trend and the second trend and pull them together, creating a third trend depicting the effect the operating temperature of the machine has on the amount of energy used by the machine. For example, the third trend may indicate that as the operating temperature increases, the machine uses more energy.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Human-Machine Interface (HMI) system, the method comprising:
   receiving operational data associated with an operation of a machine;
   processing the operational data associated with the operation of the machine to determine a trend in the operational data;
   displaying a graphical representation of the trend;
   receiving a first user input and a second user input simultaneously on a surface of a user interface;
   processing the first user input and the second user input to determine a change in the trend; and
   displaying a graphical representation of the change in the trend.

2. The method of claim 1 wherein displaying the graphical representation of the change in the trend comprises expanding the graphical representation of the trend.

3. The method of claim 1 wherein displaying the graphical representation of the change in the trend comprises compressing the graphical representation of the trend.

4. The method of claim 1 wherein displaying the graphical representation of the change in the trend comprises changing a scale of the graphical representation of the trend.

5. The method of claim 1 wherein displaying the graphical representation of the change in the trend comprises removing a portion of the graphical representation of the trend.

6. The method of claim 1 further comprising displaying the graphical representation of the change in the trend on a second display.

7. The method of claim 1 further comprising sending the operational data corresponding to the graphical representation of the change in the trend to a storage system.

8. A Human-Machine Interface (HMI) system comprising:
   a machine interface configured to receive operational data associated with an operation of a machine;

a processing system configured to process the operational data associated with the operation of the machine to determine a trend in the operational data;

a user interface configured to display a graphical representation of the trend, and receive a first user input and a second user input simultaneously on a surface of the user interface;

the processing system configured to process the first user input and the second user input to determine a change in the trend; and the user interface configured to display a graphical representation of the change in the trend.

9. The HMI system of claim 8 wherein the user interface is configured to display the graphical representation of the change in the trend by expanding the graphical representation of the trend.

10. The HMI system of claim 8 wherein the user interface is configured to display the graphical representation of the change in the trend by compressing the graphical representation of the trend.

11. The HMI system of claim 8 wherein the user interface is configured to display the graphical representation of the change in the trend by changing a scale of the graphical representation of the trend.

12. The HMI system of claim 8 wherein the user interface is configured to display the graphical representation of the change in the trend by removing a portion of the graphical representation of the trend.

13. The HMI system of claim 8 wherein the user is interface configured to display the graphical representation of the change in the trend on a second display.

14. The HMI system of claim 8 wherein the processing system is configured to send the operational data corresponding to the graphical representation of the change in the trend to a storage system.

15. A software product configured to operate a Human-Machine Interface (HMI) system, the software product comprising:

HMI interface software configured to direct a machine interface to receive operational data associated with an operation of a machine;

HMI operation software configured to direct a processing system to process the operational data associated with the operation of the machine to determine a trend in the operational data;

the HMI interface software configured to direct a user interface to display a graphical representation of the trend, and receive a first user input and a second user input simultaneously on a surface of the user interface;

the HMI operation software configured to direct the processing system to process the first user input and the second user input to determine a change in the trend;

the HMI interface software configured to direct the user interface to display a graphical representation of the change in the trend; and a storage system that stores the HMI operation software and the HMI interface software.

16. The software product of claim 15 wherein the HMI interface software is configured to direct the user interface to display the graphical representation of the change in the trend by expanding the graphical representation of the trend.

17. The software product of claim 15 wherein the HMI interface software is configured to direct the user interface to display the graphical representation of the change in the trend by compressing the graphical representation of the trend.

18. The software product of claim 15 wherein the HMI interface software is configured to direct the user interface to display the graphical representation of the change in the trend by changing a scale of the graphical representation of the trend.

19. The software product of claim 15 wherein the HMI interface software is configured to direct the user interface to display the graphical representation of the change in the trend by removing a portion of the graphical representation of the trend.

20. The software product of claim 15 wherein the HMI interface software is configured to direct the user interface to display the graphical representation of the change in the trend on a second display.

* * * * *